Jan. 23, 1968     W. C. CORTNER, JR., ET AL     3,365,700
TELEMETERING INVENTORY SYSTEM
Filed Feb. 5, 1962
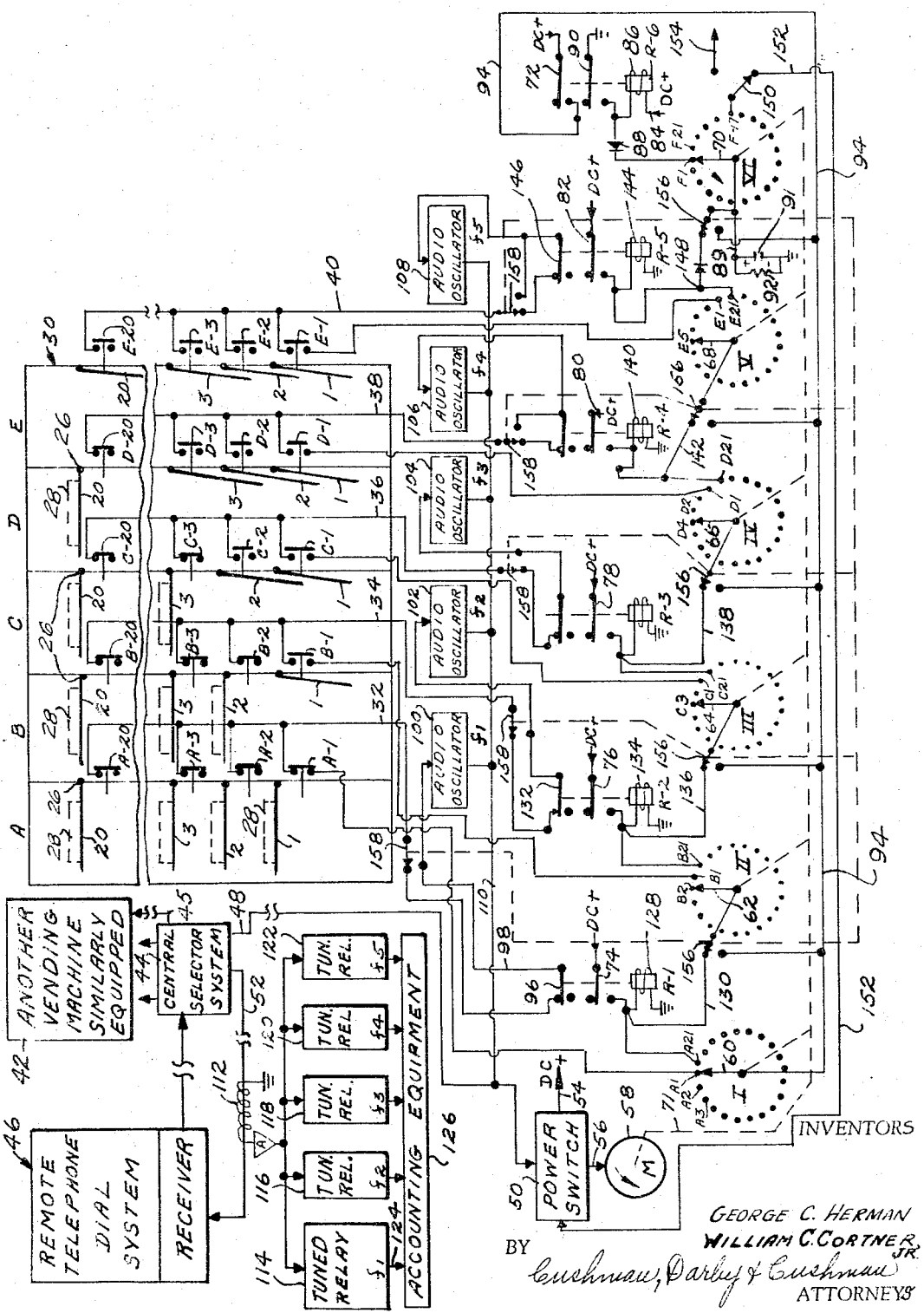
INVENTORS
GEORGE C. HERMAN
WILLIAM C. CORTNER, JR.
BY Cushman, Darby & Cushman
ATTORNEYS United States Patent Office 3,365,700
Patented Jan. 23, 1968

3,365,700
TELEMETERING INVENTORY SYSTEM
William C. Cortner, Jr., 2601 E. Barry Road, Kansas City, Mo. 64155, and George H. Herman, Silver Gate, Mont.; said Herman assignor to said Cortner, Jr.
Filed Feb. 5, 1962, Ser. No. 171,032
16 Claims. (Cl. 340—153)

This invention relates to an inventory system, and particularly to an automatic telemetering inventory system for remotely determining usage of items such as might be disposed in an automatic vending machine.

Though the description proceeds in relation to a vending machine, it will be apparent that the inventory system may be used in determining usage of any type of item, or a plurality of different items, whether initially disposed in a vending machine or not.

By this invention, management can check any one of its vending machines to determine if it was serviced on schedule, and whether it was properly filled with the merchandise being sold. Management can also, at any time of the day or night, check the amount of each type of merchandise sold by any one of its vending machines, and compare the cash receipts with the sales reported by a route man. From this invention, management can determine the peak and slack buying hours, and what items are in most demand at each one of its vending machines, and can detect any sold-out conditions before a complaint is made. Further, it will be apparent that this invention aids in the elimination of waste of perishable foods, cuts route costs since each route man would serve only the machines that were in immediate need of attention and thereby increase his productivity, gives management complete route control and ability to pin point normally unexplainable shortages, allows management to determine if any machine is out of order, and aids in building better customer relations by knowing what is happening at each location at all times. By extensive use of this invention, the best management policies of vending operation may be put to work and directed and controlled, making each route as productive as the combined knowledge of management. Further, the invention will make an automatic vending machine complete, and in general stimulate the vending industry.

Accordingly, this invention has as an object an automatic telemetering inventory system for automatic vending machines, which will effect the purposes and advantages above indicated.

Other objects and advantages of this invention will become apparent upon reading the following detailed disclosure and appended claims in conjunction with the accompanying drawing which illustrates an exemplary embodiment of the invention.

The drawing diagrammatically shows an automatic vending machine 30 that has a plurality of columns, five being shown and designated A through E, respectively. This number of columns is only exemplary, and may of course be increased or decreased in accordance with the particular situation at hand. Each column includes, for example, twenty stores having shelves the bottom three and top one of which are illustrated in the drawing and designated respectively 1, 2, 3, 20. Any particular shelf referred to hereinafter in this description is designated by a combination of its column letter and shelf number in that column, for example shelf A-1, which of course refers to the lowest shelf in the left column in the vending machine 30. Each of these shelves, in the specific embodiment being described, is hinged at one side, as at respective points 26, so that the removal of the merchandise, for example a sandwich 28 disposed on the shelf automatically causes the shelf to drop downward, by conventional means not shown, as to the position shown by shelf B-1.

Associated with each shelf is a means for indicating usage of the item on that shelf. For example, each shelf has associated with it a respective normally-closed pushbutton switch, preferably of the microswitch type, which has its contacts opened when the associated shelf drops as may be noted by reference to switch B-1. An associated shelf and switch are given the same designation, switch B-1 being that switch which is associated with shelf B-1.

By reference to the drawing, it will be noted that all of the illustrated shelves in column A are in their up position, and consequently all of the column A switches are closed. In column B, only the lowest shelf 1 has been dropped due to removal of merchandise previously thereon, and accordingly only the lowest switch associated with column B has its contacts opened. In column C, the two lower shelves are down, so switches C-1 and C-2 are open, while in column D the three lower shelves are down and the associated D switches are open. For column E, all four of the illustrated shelves are down, so the associated switches E-1, E-2, E-3 and E-20 are open. It will be noted that all of the upper contacts of each switch for any one column are connected in parallel to a given output line. That is, all the column A switches have their upper contacts connected to line 32, those in column B to line 34, those in column C to line 36, those in column D to line 38, and those in column E to line 40. How these lines and the lower contacts of each of the switches are connected into the inventory system is described below in detail, after the following discussion of the remote telemetering equipment.

The drawing illustrates a system which will selectively inventory any one of a number of vending machines and/or vending machines stations which are equipped in accordance with this invention, for example equipped as illustrated in detail. That is, besides the illustrated detailed vending machine, another vending machine 42 similarly equipped may be selected instead, to inventory the number of items used in any one category of items, or all of the categories thereof which the particular vending machine handles. In this respect, though the items 28 diagrammatically shown in the drawing are all similar, it will be of course appreciated that each column of the vending machine may dispense a different type of merchandise as is the usual case.

To effect selection of one vending machine as opposed to another, a central selector system 44 may be employed in conjunction with a remote telephone dial and receiver system 46. The remote telephone dial system may be of the conventional nature to apply a unique signal to the central selector system 44 upon dialing a particular number which corresponds to the designation of the vending system to be inventoried. The central selector system may also be of the conventional type employed in regular telephone systems, which accepts the unique signal applied to it and effectively decodes same to provide an output signal on the proper one of its output lines. For example, to select vending machine 42, the selector system would provide an appropriate signal on line 45 to the exclusion of each of its other indicated output lines including line 48. On the other hand, to inventory vending machine 30, a different number would be dialed, and only output line 48 would be selected by the selector system 44. When this happens, the signal provided to line 48, which may be a conventional telephone line extending a considerable distance, arrives at the location of vending machine 30 to energize power switch 50. This switch may be so equipped (by conventional means not shown) to return a normal telephone type, busy signal over line 48 if the vending machine being called has any of its electrical or mechanical equipment improperly functioning so as not to be able to "answer" the call properly. This immediately provides a signal back through the selector system 44 and over line 52, to the receiver, aprising the operator thereof of the out-of-order condition of the particular vending machine.

On the other hand, when the vending machine and its equipment are properly functioning, the energizing signal on line 48 causes power switch 50 to provide a positive DC signal on line 54 and an AC or motor energizing signal on line 56. The latter starts motor 58, causing counterclockwise rotation of each of the six movable or scanning switch arms 60, 62, 64, 66, 68, 70, which are mechanically coupled together and to the shaft of motor 58, as indicated by dash line 71. Each of these arms is associated with a respective scanning switch I through VI, each of which has, in the particular embodiment being described, twenty-one stationary contacts respectively designated, for example switch I, A-1 through A-21.

The left five scanning switches I-V are respectfully associated with the groups A-E of microswitches in the vending machine 30, with each microswitch being connected via its lower contact to a different one of the contacts of its respective scanning switch. In an effort to present the invention more clearly and prevent needless illustration of connections, not all of these connections between the microswitches and respective scanning switches are illustrated, it being sufficient as shown in the drawing to indicate that contact A-1 of scanning switch I is connected to the lower terminal of microswitch A-1, the B-1 contact of scanning switch II is connected to the lower terminals of microswitch B-1, and the respective lower terminals of microswitches C-1, D-1, and E-1 are respectively connected to the similarly designated contacts of scanning switches III, IV, and V. In like manner, it is to be understood that the scanning switch connections A-2, B-2, C-2, D-2, and E-2 are respectively connected to the lower terminals of the vending machine column microswitches A-2, B-2, C-2, D-2, and E-2, and so forth relative to the remainder of the first 20 contacts of each of the scanning switches I-V.

Scanning switch VI may be utilized mainly for initially connecting a scanning voltage to the scanning switches and to cause the power switch 50 to be turned off. The positive DC voltage that becomes available on line 54 from power switch 50 when that switch is initially turned on by an energizing signal from line 48, is delivered thereby to several places including relay switch arms 72, 74, 76, 78, 80 and 82. As will be appreciated from the drawings, this DC signal is normally dead-ended by these relay switch arms since each of these arms is normally in its illustrated up position against a contact which is connected to nothing else. In the first embodiment to be described, these relay switch arms are moved downward sequentially in the order 72, 74, 76, 78, 80, 82 since their respective relay coils are energized in that order as will be apparent from the following description.

As soon as motor 58 starts its shaft turning, rotatable arm 70 of scanning switch VI eventually, if not immediately, arrives at its contact designated F-1. This completes a current path for the positive DC voltage (which is on the relay R-6 input line 84, having been derived from that on line 54 at the power switch 50) through coil 86 on relay R-6, rectifier or unidirectional current conducting device 88, contact F-1, arm 70 and line 89 connected thereto, to a condenser 91 which is otherwise connected to ground. This condenser may be of the electrolytic type if desired, with polarity being as indicated. The momentary potential-dividing action of condenser 91 provides a sufficient voltage across relay coil 86 to effect energization thereof and the consequent actuation of relay switch arms 72 and 90. In due course, a bleeder resistor 92 removes the charge on condenser 91, but by this time relay switch arm 90 has been pulled downward against its lower contact and coil 86 remains energized because arm 90 completes an alternative path to ground.

The energization of relay R-6 causes the positive DC potential on relay arm 72 to be conveyed via line 94 to movable arm 60 of scanning switch I. In effect, this all takes place instantly; that is, when arm 70 of scanning switch VI touches contact F-1, the resultant DC potential on line 94 is conveyed to arm 60 of scanning switch I while arm 60 is still on its contact A-1. Therefore, the DC signal is delivered to microswitch A-1 associated with the lower shelf in column A of the vending machine. Since this shelf is in its up position, the merchandise thereon not having been used yet, microswitch A-1 is still in its unactuated or closed position completing a circuit via line 32 to relay arm 96 associated with relay R-1. Scanning switch arm 60 has not yet reached its contact A-21 (in fact it is still on contact A-1), so relay R-1 is still de-energized, and its switch arm 96 completes a circuit from line 32 to line 98 thereby energizing an audio frequency oscillator 100. This oscillator immediately provides an output signal which has a unique or identifying characteristic associated only with the column A type item being dispensed. Preferably, this identifying characteristic is in the form of a particular frequency, for example frequency $f_1$ as opposed to the frequency which any one of the other signal generating oscillators 102, 104, 106 and 108 provide for their respective columns of merchandise. Oscillator 100 effects a short tone or burst of frequency $f_1$ to output line 110, which is common to each of the other audio frequency oscillators 102, 104, 106 and 108. This output line 110 is connected back to the central selector system 44 via the telephone line 48, and thence to the receiver portion, if desired, of the remote telephone system 46. Inductively coupled to the receiver line 52 is a coil 112 that picks up the burst of audio frequency, which is then amplified and delivered to each of five different tuned relay circuits 114, 116, 118, 120 and 122. These relay circuits may each include a filter followed by a rectifier the output of which operates a relay when the signal coupled to the filter is of the frequency which the filter will pass. In other words, the relays are "tuned", each to a different frequency, or frequency band, which corresponds in frequency to the outputs of audio oscillators 100, 102, 104, 106, 108.

To continue with the case when oscillator 100 first provides a burst of frequency or group of pulses of frequency $f_1$ that signal is detected by tuned relay 114, which in turn provides an output signal on line 124 to accounting equipment 126. This accounting equipment may be of any type desired. For example, each of the tuned relay output lines may be connected to a separate counter which updates itself by a count of one upon receipt of each sufficient input signal, or the accounting equipment may be more elaborate and require energization by a tuned relay output signal of mechanism which causes the positioning and punching of a hole in a particular column of a business record card as that card is progressively moved row by row in synchronism with the interrogation of the respective microswitch in the corresponding column of the vending machine. Any other type of accounting equipment desired, including mere signal lights the number of flashes of which may be humanly counted, is intended to be included within the scope of this invention.

As scanning arm 60 moves off of its contact A-1 and onto its contact A-2, the condition of microswitch A-2 in vending machine 30 is thereby sensed. As illustrated, this microswitch is closed since shelf A-2 is still in its up position, so a second burst of frequency $f_1$ is generated by oscillator 100 and conveyed to pick up coil 112 at the remote receiving end. Therefore, tuned relay 114 provides another short output pulse, giving an indication that not only one, but at least two items of merchandise are still present in column A of the vending machine. Scanning switch 60 continues to move counterclockwise causing the condition of each of the microswitches associated with column A to be sensed, and a corresponding burst or no-burst of frequency $f_1$ to be transmitted back to the receiving station.

After scanning switch arm 60 has passed each of its contacts A–1 through A–20, it then moves on to contact A–21. It will be noted that this contact is not connected with any microswitch or the like in any column of the vending machine, but instead is connected to coil 128 of relay R–1, the other end of this coil being grounded. Therefore, the DC signal on scanning arm 60 causes actuation of relay R–1, pulling its switch arms 74 and 96 downward against their respective lower contacts. In this manner, coil 128 stays energized via the DC potential on the relay switch arm 74, even after scanning arm 60 moves off of its contact arm A–21. At the moment that coil 128 receives a DC potential, first via scanning switch contact A–21 and then via relay arm 74, this potential is delivered via line 130 to movable arm 62 of scanning switch II. While arm 60 of scanning switch I is on its contact A–21, arm 62 of scanning switch II is in a corresponding angular position but on the contact designated B–1. That is, as will be noted by inspection of the drawing, each stationary contact of scanning switch II carries a numerical designation of one less than the scanning switch I contact that has the same angular position. This same situation will be seen to exist relative to the contact designations of each succeeding scanning switch II–V with respect to its immediately proceeding scanning switch I–IV.

Accordingly, as relay R–1 becomes energized, the DC potential via line 130 and scanning arm 62 to contact B–1, effects interrogation of the condition of microswitch B–1 associated with shelf 1 of column B in the vending machine 30. Since this shelf is down, microswitch B–1 is open and no signal is applied over line 34 via relay switch arm 132 to oscillator 102. As a consequence, no output signal is derived from the tuned relay 116 at the receiving end of the system, indicating that no item of merchandise is left on shelf 1 of column B.

Scanning arm 62 continues to move counterclockwise and onto its contact B–2. At the same time, arm 60 of scanning switch I moves from its contact A–21 to its contact A–1, but since relay R–1 is now energized, relay switch arm 96 has been pulled downward, so no signal is passed from line 32 via that relay arm to oscillator 100. In other words, the interrogation of switches associated with column A of the vending machine has not only been completed, but will not be repeated during the second revolution of scanning switch I. Instead, column B situation is the only one sensed during the second revolution of motor 58.

Microswitch B–1 has already had its condition sensed, so now microswitch B–2 associated with the second shelf of column B of the vending machine gets interrogated since scanning switch arm 62 is on its contact B–2. With microswitch B–2 closed, a signal is caused to be on line 34, and this signal gets conveyed through closed relay switch arm 132, to audio oscillator 102, which now provides a short group or burst of pulses of frequency $f_2$. As previously indicated, the output signal of this oscillator is conveyed via lines 110 and 48 back through the selector system 44 onto the receiver line 52. Detector coil 112 inductively picks up this $f_2$ signal and relay 116, which is tuned to the frequency of that signal, provides an output signal to accounting equipment 126.

The interrogation of the remaining switches associated with column B proceeds in like manner as heretofore described, and when movable scanning arm 62 arrives at its contact designated B–21, relay R–2 becomes actuated by the effect of potential thereby applied to its coil 134, opening relay switch arm 132 and disconnecting oscillator 102, while applying a holding potential via relay switch arm 76 to the coil of relay R–2. The DC potential then on line 136 energizes the rotating arm 64 of scanning switch III, which is on its contact C–1 at the time when arm 62 of scanning switch II is on its contact B–21. The sensing of the condition of each of the column C shelf switches in the vending machine 30 progresses in the same manner as heretofore indicated for the previous column interrogations, and at the end thereof relay R–3 becomes energized with a potential being applied to line 138 to energize the rotating arm 66 of scanning switch IV. Accordingly, the condition of each of the 20 microswitches associated with column D of the vending machine is interrogated successively, at the end of which coil 140 of relay R–4 is energized and a potential is applied to line 142. This in turn energizes rotating arm 68 of scanning switch V, causing a sensing of the condition of the column E switches. Of course, when any microswitch associated with any of the columns in the vending machine is found closed by the sensing current applied thereto via the associated scanning switch arm, the corresponding column oscillator is momentarily energized to effect a burst of its particular frequency, and that burst is detected by the corresponding tuned relay 114–122 back at the receiving station, causing an accounting as heretofore indicated.

When the rotating arm 68 of scanning switch V arrives on its contact E–21, the coil 144 of relay R–5 is energized, thereby disconnecting oscillator 108 by opening relay switch arm 146, and holding the relay actuated by applying to coil 144 the DC potential on relay switch arm 82. While rotating arm 68 is still on contact E–21, and thereafter during the continued application of a DC potential to relay switch arm 82, line 148 has a DC potential connected to it, which is consequently delivered to line 89 and rotating arm 70. Rectifier 88 prevents that potential from being shorted to ground; hence it isolates contact F–1 from ground and makes it possible to scan over that contact and use the other contacts of switch VI to indicate the operating conditions and malfunctions of the vending machine as desired. Also, while arm 68 of scanning switch V is on its contact E–21, rotating arm 70 of scanning switch VI is on its contact F–17, thereby applying the DC potential that is on arm 70 to manual switch 150 which, when in the position illustrated, applies the DC potential to line 152 and back to power switch 50, causing that switch to be turned off, and thereby turning off motor 56 and stopping the generation of a DC potential on line 54. This not only stops the rotating of the scanning switch arms, but removes the DC potential from each of the relay coils and their respective switch arms, thereby returning all of the relay switch arms to their normal (illustrated) positions.

It may be noted that it makes no difference whether motor 58 is braked or not, i.e. whether rotating switch arm 70 stops past its contact F–1 or not, since when the motor is re-started at the beginning of a subsequent inventory of the vending machine, the then rotating, scanning switch arm 70 will not itself be energized until it again reaches contact F–1. Any conventional motor braking system, however, may be utilized with motor 58, if desired.

If it is desired to interrogate more than one vending machine by the dialing of a single number, switch 150 may be moved to its up position to apply the DC potential, which is derived from line 148 and present on scanning switch arm 70 at the end of inventory machine 30, to line 154, in which case line 152 may be connected to another vending machine similarly equipped and located near by, assuming motor 58 operates the scanning switches of both machines.

In the foregoing description, the microswitches associated with the different columns were sensed as to their condition not only successively within each column, but also successively by columns. As an alternative arrangement, each of the columns may be sensed simultaneously. This may be effected by changing each of the five switches 156, which are respectively connected to scanning switch arms 62, 64, 66, 68, and 70, to their unillustrated positions, while doing the same for each of the five switches 158 in order to connect microswitch output lines 32, 34, 36, 38 and 40 to their respective audio frequency oscillators. In this situation, as soon as the DC potential is applied to line 94 in the manner previously indicated, each of the scanning switch arms 60, 62, 64, 66, 68 and 70 has a potential applied to it, and the sequential interrogation of the twenty microswitches of each column proceeds then at the same time for each column. Of course, in this case, the scanning switch stationary contacts of the same angular position would have the same designation and would be connected to corresponding microswitches of the different vending columns, (for example, contact B–2 would be effectively renumbered as B–1 and would be connected to microswitch B–1) and the then A–21, B–21, C–21, D–21, and E–21 contacts would not need to be connected to the relays R–1 through R–5 since these relays then would have no purpose. In addition, switch 150 would be connected to the terminal designated F–21 of scanning switch VI, rather than to contact F–17, to effect a turning off of power switch 50. In this case, as well as in the case where all of the microswitches in the vending machine are sensed sequentially, it makes no difference whether motor 58 stops turning immediately or not, since scanning arm 70 is not energized, following a re-energization of power switch 50 by a signal on line 48, until it connects with its contact F–1 and energization is applied via line 94 back to line 89 through the respective switch 156 to arm 70.

As a consequence, even if arm 70 first passes over its contact F–21 when motor 58 first starts revolving, no turn-off or other type signal will issue from switch 150 until after arm 70 has first contacted its contact F–1.

Oscillators 100–108 may be of any conventional nature and are preferably of the inexpensive, neon bulb type.

There is no limit to the number of microswitches which may be associated with any column of shelves, i.e., the vending machine may be of the type which has many more than 20 shelves; on the other hand, the number of shelves may be considerably less than 20. In theory, there is no limit, either, in the number of vending machine columns that may be sensed either simultaneously or sequentially, though in reality the number may be expense-wise limited to approximately twenty in view of the necessity to cause each of the tuned relays preceding the accounting equipment 126 to be actuated only in response to its respective frequency or small band of frequencies. In other words, there is a considerable amount of expense involved in making the filtering portion of the tuned relays sensitive enough to eliminate harmonics when a relative large number of vending columns is to be checked. This is particularly true when the system is operated to effect simultaneous checking of the different columns, rather than sequentially checking the columns. The only gain to be realized by simultaneous interrogation of the columns of switches is the elimination of a few relays and a faster return of total information. In the case of a five column, 20 shelf vending machine, the over all interrogation time for sequential sensing is 18 seconds, based on the scanning switch drive motor 58 turning one revolution every three seconds, which is in correspondence with the speed that present day digital counters, for example those which may be in the accounting equipment 126, will operate. If all columns are interrogated at one time, a complete report may be obtained in three seconds.

Thus there has been disclosed apparatus which will successfully accomplish the purposes, objects and advantages hereinbefore mentioned. Upon reading this description, one of ordinary skill in the art will appreciate that the invention may have other objects, purposes, and/or advantages, and that it may be embodied differently. Accordingly, the foregoing description and drawing should be interpreted as illustrative, not limitative, the scope of the invention being defined by the appended claims.

What is claimed is:

1. An inventory system for determining usage in each group of a plurality of groups of items usage of which causes actuation of respective switch means from one condition to another condition, comprising said plurality of groups of such switch means a plurality of signal generators having different respective identifying characteristics in their output signals and respectively assigned to said groups, means operable upon receipt of an input signal for sequentially sensing the condition of each said switch means in each of said groups and means for causing each of the said signal generators to effect an output signal with its said identifying characteristic once for each switch means sensed in its respectively assigned group to be in a given one of said conditions.

2. A system as in claim 1 wherein said sensing means includes means for causing all said groups of groups of switch means which groups respectively correspond to said item groups, to be sensed concurrently.

3. A system as in claim 1 wherein said sensing means includes means for causing all of the said groups of switch means to be sensed sequentially.

4. A system as in claim 1 wherein said sensing means includes a plurality of ganged rotary switches each having a movable contact arm and a like number of contacts, respective contacts of different switches being connectable to respective switch means in different ones of said groups, and means for rotating said switch arms upon receipt of said input signal.

5. A system as in claim 4 including means coupled between successive ones of said switches for transferring power from one to the next upon completion of a cycle of the former.

6. An inventory system for use with at least one machine which has a plurality of holding means groups each of which has a plurality of means for holding items, comprising multi-condition means associated with each of said holding means and having two conditions from one to the other of which the respective multi-condition means is actuated when an item has been removed from a respective holding means, a plurality of signal generators each having a different identifying characteristic in its output signal and being respectively assigned to a different one of said groups, and means operable upon receipt of an input signal for sequentially sensing the condition of each of said multi-condition means for each of said groups and means for causing each of the said signal generators to effect its respective said output signal once for each said sensing of a multi-condition means that is in a given one of said conditions, to determine whether an item is present or has been removed from a respective holding means.

7. A system as in claim 6 wherein said signal generators provide their respective output signals at different frequencies for providing said different identifying characteristics.

8. A system as in claim 6 including means commonly coupled to said signal generators for discriminating between the received output signals thereof in accordance with their said identifying characteristics.

9. A system as in claim 8 and further including means coupled to the detecting means for effectively recording a count of the number of occurrences of each different output signal.

10. An inventory system as in claim 6 wherein said machine is a vending machine having a plurality of columns each with a plurality of shelves, said holding means groups are said columns, and said means for holding items are said shelves.

11. An inventory system as in claim 6 wherein said sensing means includes a plurality of rotary switches each having a movable arm and, contactable thereby, a plurality of contacts connected to each of said indicating means, and means including ganging means for rotating all of the rotary switches upon receipt of said input signal to effect said sensing.

12. A system as in claim 10 wherein each of said multi-condition means is a normally closed switch, said shelves being hingedly dropable, when an item is removed therefrom, against its respective switch to effect opening thereof.

13. An inventory system as in claim 11 including an additional rotary switch having a movable arm and a source of power to the movable arm of another of said rotary switches upon rotation of the arm of said additional rotary switch to a given contact thereof including means for maintaining said source of power on the movable arm at said additional rotary switch even after the arm of said additional rotary switch rotates off said given contact.

14. An inventory system for use with at least one vending machine which has a plurality of columns each having a plurality of shelves comprising:
 said vending machine,
 a respective normally closed switch associated with each of said shelves for electrically indicating when an item has been removed from the respective shelf, said shelves being hingedly dropable, when an item is removed therefrom, against its respective switch to effect opening thereof,
 a plurality of signal generators each having a different identifying characteristic in its output signal and being respectively assigned to a different one of said columns,
 means operable upon receipt of an input signal for sequentially sensing the condition of each said switch for each of said columns,
 said sending means including a plurality of rotary switches each having a movable arm and, contactable thereby, a plurality of contacts including at least one more such contact than the number of normally closed switches in the respective column of said vending machine, said contacts, except said one, for each respective rotary switch being respectively connected to one side of each normally closed switch associated with a given column, and an additional one of said rotary switches ganged with the others and with means for rotating all of the rotary switches upon receipt of said input signal,
 means responsive to said input signal for causing generation of a source of power,
 means connected to said additional rotary switch for coupling said source of power to the movable arm of another of said rotary switches upon rotation of the arm of said additional rotary switch to a given contact thereof, including means for maintaining said power on the movable arm of said another rotary switch even after the arm of said additional rotary switch rotates off said given contact,
 means coupled between the said one contact of each of said rotary switches that are otherwise coupled to the respective columns of normally closed switches to the movable arm of a succeeding rotary switch to effect transfer of power from one rotary switch to the next at the end of a revolution of the former,
 means coupled to the said one contact of the said additional rotary switch for stopping the rotation of all of said rotary switches after the arm of each of the other said rotary switches has completed one revolution with said power source coupled to it, and
 means for causing each of the said signal generators to effect an output signal with its said identifying characteristic once for each indication by the respective indication means for each column that an item has not been removed from a respective shelf.

15. An inventory system for use with at least two vending machines each of which has a plurality of columns with a plurality of shelves, comprising:
 said vending machines,
 means associated with each of said shelves of each machine for electrically indicating when an item has been removed from the respective shelf,
 a plurality of signal generators each having a different identifying characteristic in its output signal and being respectively assigned to a different one of said columns of each machine,
 means operable upon receipt of an input signal for sequentially sensing the condition of each of said indicating means for each of said machine columns,
 means causing each of the said signal generators to effect an output signal with its said identifying characteristics once for each indication by the respective indication means for each column that an item has not been removed from a respective shelf,
 means for selecting any one of said vending machines to the exclusion of every other,
 means for receiving the said output signals of the selected machine to the exclusion of those from any other, and
 means coupled to the output of the said receiving means for discriminating between the received output signals according to their said identifying characteristics.

16. An arrangement as in claim 15 and further including means coupled to said discriminating means for effectively recording a count of the number of occurences of each different output signal for each said machine.

References Cited

UNITED STATES PATENTS

| | | | |
|---|---|---|---|
| 2,719,960 | 10/1955 | Bachelet et al. | 340—163 |
| 2,905,926 | 9/1959 | Aid | 340—147 |
| 2,504,931 | 4/1950 | Knudsen | 340—213 |
| 2,504,999 | 4/1950 | McWhirter | 340—147 |
| 2,549,401 | 4/1951 | Stein et al. | 340—213 |
| 2,839,737 | 6/1958 | Dalglish | 340—150 |
| 2,842,753 | 7/1958 | Ewen | 340—171 |
| 3,009,134 | 11/1961 | Brush | 340—171 |
| 2,526,512 | 10/1950 | Snell et al. | |

FOREIGN PATENTS 286,018  3/1928  Great Britain.

JOHN W. CALDWELL, *Primary Examiner.*

NEIL C. READ, THOMAS B. HABECKER, SAUL I. SEROTA, *Examiners.*

L. A. HOFFMAN, P. XIARHOS, D. YUSKO,
*Assistant Examiners.*